US006807372B1

(12) United States Patent
Lee et al.

(10) Patent No.: US 6,807,372 B1
(45) Date of Patent: Oct. 19, 2004

(54) INTEGRATED SPECTRAL ENCODER/DECODER FOR OPTICAL CDMA COMMUNICATION SYSTEM

(75) Inventors: Chauhan Daniel Lee, Middletown, NJ (US); Shan Zhong, N. Billerica, MA (US); Yung Jui Chen, Ellicott City, MD (US)

(73) Assignee: University of Maryland, Baltimore, MD (US)

( * ) Notice: Subject to any disclaimer, the term of this patent is extended or adjusted under 35 U.S.C. 154(b) by 651 days.

(21) Appl. No.: 09/616,436

(22) Filed: Jul. 14, 2000

(51) Int. Cl.[7] .......................... H04J 13/00; H04J 14/00; G02B 6/293; G02B 6/34; G02B 6/42

(52) U.S. Cl. ............................... 398/78; 398/77; 398/87; 398/183; 398/201; 398/214; 385/24; 385/37

(58) Field of Search ............................ 398/77, 78, 139, 398/141, 183, 188, 43, 46, 82, 99, 14; 341/137; 385/24, 31, 37, 11, 140; 359/484

(56) References Cited

U.S. PATENT DOCUMENTS

| | | | |
|---|---|---|---|
| 5,617,234 A | * 4/1997 | Koga et al. | 398/14 |
| 5,760,941 A | * 6/1998 | Young et al. | 398/183 |
| 5,809,184 A | * 9/1998 | Doerr et al. | 385/11 |
| 5,867,290 A | * 2/1999 | Dutt et al. | 398/43 |
| 5,881,199 A | * 3/1999 | Li | 385/140 |
| 6,212,315 B1 | * 4/2001 | Doerr | 385/31 |
| 6,304,380 B1 | * 10/2001 | Doerr | 359/484 |
| 6,332,055 B1 | * 12/2001 | Hatayama et al. | 385/140 |
| 6,351,581 B1 | * 2/2002 | Doerr et al. | 385/24 |
| 6,597,841 B1 | * 7/2003 | Dingel | 385/37 |

FOREIGN PATENT DOCUMENTS

| WO | WO 9954764 A1 | * 10/1999 | G02B/6/12 |
|---|---|---|---|

OTHER PUBLICATIONS

Lam, Cedric F. "Multi–wavelength Optical Code–Division–Multiple–Access Communication Systems." Diss. U of California Los Angeles, 1999.*

Lee, C. et al. "Proposed planar lightwave circuit design of programmable optical CDMA spectral encoder/decoder using array–waveguide grating." 1999 Digest of the LEOS Summer Topical Meetings: Nanostructures . . . Jul. 26–30, 1999: II39–II40.*

Lee, C. et al. "Planar lightwave circuit design for programmable complementary spectral keying encoder and decoder." Electronics Letters. vol. 35, No. 21. Oct. 14, 1999: 1813–1815.*

Babich, C.D. and J.F. Young. "Performance modeling of a planar waveguide based spectral encoding system." Lasers and Electro–Optics Society 1999 12th Annual Meeting. LEOS '99. IEEE. Nov. 8–11, 1999: 523–524, vol. 2.*

(List continued on next page.)

*Primary Examiner*—Jason Chan
*Assistant Examiner*—David Kim
(74) *Attorney, Agent, or Firm*—Fleshner & Kim LLP

(57) ABSTRACT

The encoder/decoder design for spectrum-encoded optical CDMA systems uses waveguide circuits monolithically integrated on one chip to fulfill essential encoding and decoding functions. The integrated device functions as a 1×2 wavelength selective Mach-Zehnder interferometer switch to encode the input broadband light source and to decode the transmitted spectrally encoded signals. The device comprises a frontal 3-dB coupler, a double-ended arrayed-waveguide grating (AWG), and arrays of thermooptic phase shifters and attenuators, together with their symmetric images reflected from the high-reflection coated facet, to realize all required functionality. The thermooptic phase shifters and attenuators are programmable through electronic interface to realize programmable encoding and decoding capabilities. The attenuators are used to equalize the powers and to increase the ON/OFF extinction ratio of all spectral chips.

21 Claims, 9 Drawing Sheets

OTHER PUBLICATIONS

Griffin, R.A. et al. "Coherence coding for photonic code–division multiple access networks." Journal of Lightwave Technology. Sep. 1995. vol. 13, No. 9: 1826–1837.*

Kim, S. et al. "A new family of space/wavelength/time spread three–dimensional optical code for OCDMA networks." Journal of Lightwave Technology. Apr. 2000. vol. 18, No. 4: 502–511.*

Lam, C.F. et al. "Experimental demonstration of spectrally encoded optical CDMA systems using Mach–Zehnder encoder chains." CLEO 98. Technical Digest. May 3–8, 1998: 455.*

Lam, C.F. et al. "Experimental demonstration of bipolar optical CDMA system using a balanced transmitter and complementary spectral encoding." IEEE Photonics Technology Letters. Oct. 1998. vol. 10, No. 10: 1504–1506.*

Ramaswami, R. and K.N. Sivarajan. Optical Networks: A Pratical Perspective. San Francisco: Morgan Kaufmann Publishers, Inc., 1998.*

Tsuda et al. "Photonic spectral encoder/decoder using an arrayed–waveguide grating for coherent optical code division multiplexing." OFC/IOOC '99. Technical Digest. Feb. 21–26, 1999: PD32/1–PD32/3.*

Tsuda et al. "Spectral encoding and decoding of 10Gbit/s femtosecond pulses using high resolution arrayed–waveguide grating." Electronics Letters. Jul. 8, 1999. vol. 35, No. 14: 1186–1188.*

* cited by examiner-

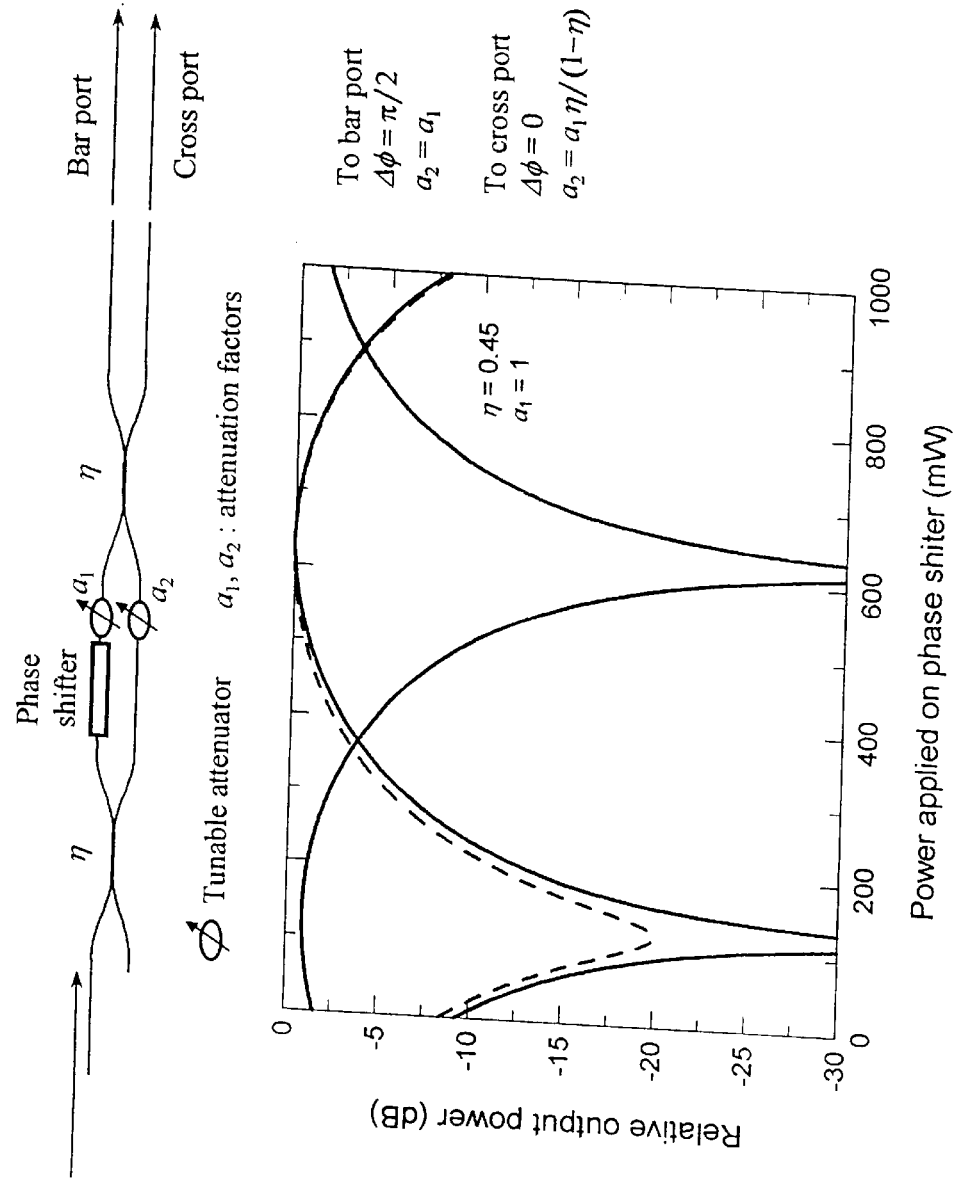
Fig.6b  Prior Art  Power Balanced MZI Switch

INTEGRATED SPECTRAL ENCODER/DECODER FOR OPTICAL CDMA COMMUNICATION SYSTEM

BACKGROUND OF THE INVENTION (1) Field of the Invention

This invention relates to optical telecommunication technology, particularly to an optical spectral encoder/decoder for a Code Division Multiple Access (CDMA) communication system.

(2) Brief Description of the Related Art

Fiber-optics communication links are gaining great popularity because the transmission medium has a comparatively unlimited bandwidth and excellent attenuation properties.

In a broadcast and select communication system, it is desirable that a number of end-user stations be able to interconnect their respective communication links through a common bus. This ability is known as multiple access. Two common multiple access systems are the time division multiple access (TDMA) and the Code Division Multiple Access (CDMA). In a TDMA system, each user is assigned a time slot. In a CDMA system, each user is assigned a special code. Signals are separated using a correlator that accepts only signal energy from the key variable binary (sequence) code used at the transmitter.

An optical CDMA (O-CDMA) system is amenable to optical communication, because the codes can be represented by different wavelengths (colors) of light. Signals can be spectrum-encoded.

Recently there has been considerable interest in CDMA systems as an efficient protocol for local area broadcast networks. Both coherent and incoherent systems have been investigated. Coherent approaches require pico- or femto-second pulsed lasers and phase detection systems that are generally complex, expensive, and cumbersome. Several different incoherent schemes have been proposed and demonstrated, some of which implemented bipolar coding as used in radio frequency CDMA and spread spectrum systems. The most successful incoherent systems employ complementary spectral keying (CSK), in which one spectral pattern is transmitted for data "1" and the complementary pattern is transmitted for data "0". CSK is a very powerful and general modulation technique that, independent of the particular coding structure used, can provide significant noise immunity and signal to noise ratio improvements. Although our discussion here is based on using a broadband incoherent source, CSK can also use coherent sources, either a short pulsed laser or an array of CW laser sources. To date most implementations of CSK, including CDMA, have used free-space bulk optics, and are not compatible with the compact packaging requirements, stability, and integration needed by telecommunications industry. In this invention, we present a design for an integrated, programmable, CSK encoder/decoder in a compact reflective symmetric structure as a new device for optical CDMA application.

The first bipolar coding technique applied to an incoherent spectrum-encoded optical CDMA system was demonstrated by James Young's group at Rice University. (Young, et al, U.S. Pat. No. 5,760,941) (FIG. 3)

FIG. 3 shows the basic spectral encoder/decoder of the present invention. As an encoder, a super-fluorescent fiber source (SFS) of light 50 is incident on a spectral demultiplexer (an optical grating in this case) 51, which spreads the light into a band 52 of light of different wavelengths (colors). The light band 52 is reflected by a first mirror 55 to pass through a coded mask 53. The mask 53 allows certain wavelengths of the reflected light from the mirror 55 to be transmitted and other wavelengths of light to be reflected. The transmitted wavelengths are reflected by a second mirror 54 and focused on the spectral multiplexer (grating) 51 to generate a single light beam 56 as spectral code for digital 1's. The reflected wavelengths from the mask 53 are reflected by the first mirror 55 and focused on the grating 51 to generate a single light beam 57 as spectral code for digital 0's. These digital codes are modulated FIG. 3 can also be used as a decoder. In this case, the incident light 50 for an encoder is replaced as an incoming signal, which is coded. The functions of the rest of the components are the same as that for an encoder. Only the incoming coded signal which correlates with the code of the mask 53 can yield 1's output as ray 56 and 0's output as ray 57.

The use of bulky optics introduces mismatch problems among encoder and decoder that affects the correlation detection process, such as the resolution and precision of the gratings, coding masks, etc.

In this invention, we utilize the planar lightwave circuit technology to implement an integrated device for this application. We will use the above system as an example to explain our concept, our invention is suitable for other types of systems stated above as well. The essential components for all required functions of a typical O-CDMA encoder/decoder can be described in FIGS. 1–2.

FIGS. 1–2 show the basic components and system of an O-CDMA system. FIG. 1 shows an O-CDMA encoding scheme. A broadband light source 10 is incident on an array waveguide grating (AWG) 11 to spread the light source into many different colors. Since the light source intensity throughout the spectrum may not be uniform, the different color lights from the grating 11 are equalized in intensity by the attenuators 12 before passing through the coded mask 13 (indicated as "Encoding Control"). The coded mask 13 transmits certain wavelengths of light and reflects other wavelengths of light. The transmitted wavelengths may represent digital 1's and the reflected wavelengths may represent digital 0's. Each set of 1's light is focused by grating 14 to generate a single light beam 16, which has a spectral code for digital "1". The set of 0's light is focused by a grating 15 to generate a single light beam 17 for spectral code "0". The output of the digital communication signal is done through the section and transmission of either a "1" signal or a "0" signal for each clock cycle. This splitting into two groups is referred to as a 1×2 switch. These two groups of spectral codes are alternately switched (modulated) with digital data 19 in a high-speed switch (modulator) 18. The output of the high speed switch 18 the coded signal 20 sent out to be transmitted.

At a receiving station, the coded signal can be decoded as shown in FIG. 2. The coded signal 30 irradiates a spectral demultiplexer 31 to spread the signal into different wavelengths. The different color signals pass through a coded mask 33, which correlates the incoming signal with the particular code of the mask 33. Certain wavelength components of the correlated signal are transmitted as digital 1's in one path. Other wavelength components are transmitted as digital 0's in another path. The 1's signals are combined on a spectral multiplexer 34 to generate a light beam 36 for spectral code "1". The 0's signals are combined by another multiplexer 35 to generate a light beam 37 for spectral code "0". The 1' light beam 36 irradiates a photodiode P1. The 0's light beam 37 irradiates a photodiode P2. The outputs of P1 and P2 are fed to a balanced detector 38, which yields a data output 40. Any uncorrelated signals appear as a noise and is canceled by the balanced detector 38.

The scheme presented in FIGS. 1–2 offers a bipolar signaling transmission for optical CDMA systems. However, using individual gratings, attenuators and switches will make devices too complex to be integrated. We take advantage of the symmetric structures and realize the encoder/decoder in the description of the invention.

SUMMARY OF THE INVENTION

An object of this invention is to integrate an O-CDMA system on a monolithic chip. Another object of this invention is to produce uniform spectral amplitude in the processing the optical signal of un-uniform spectrum. Still another object of this invention is to provide programmable capability of the O-CDMA system. A further object of this invention is to provide a combined optical multiplexer/demultiplexer for encoding and decoding for at least one optical signal.

These objects are achieved by using the same AWG both for the incoming signal and the outgoing signal. An incoming full spectrum signal is split into two paths by a 3-dB coupler. The signal in each path is decomposed into numerous spectral components and correlated with a coded mask. A phase-shifter is inserted in every one of the paths. The split signals are then reflected by a common mirror. The two reflected signals are then combined to form a Mach-Zehnder interferometer (MZI) switch. The interference of the phase-shifted signal in one path and the signal without phase-shift in the other path yield spectral code for digital "1" or "0". After digitization by the MZI switch, the spectral components make another pass at the same AWG to be focused to yield single output beam.

BRIEF DESCRIPTION OF SEVERAL VIEWS OF THE DRAWING DETAILED

FIG. 3 shows the idea of spectral encoder/decoder of Young's invention.

FIG. 1 describes an encoding scheme for O-CDMA system

FIG. 2 describes a decoding scheme for O-CDMA system.

FIG. 6(b) shows the improvement of the performance of a MZI switch with balancing attenuators built-in.

DESCRIPTION OF THE INVENTION

Figure 1:
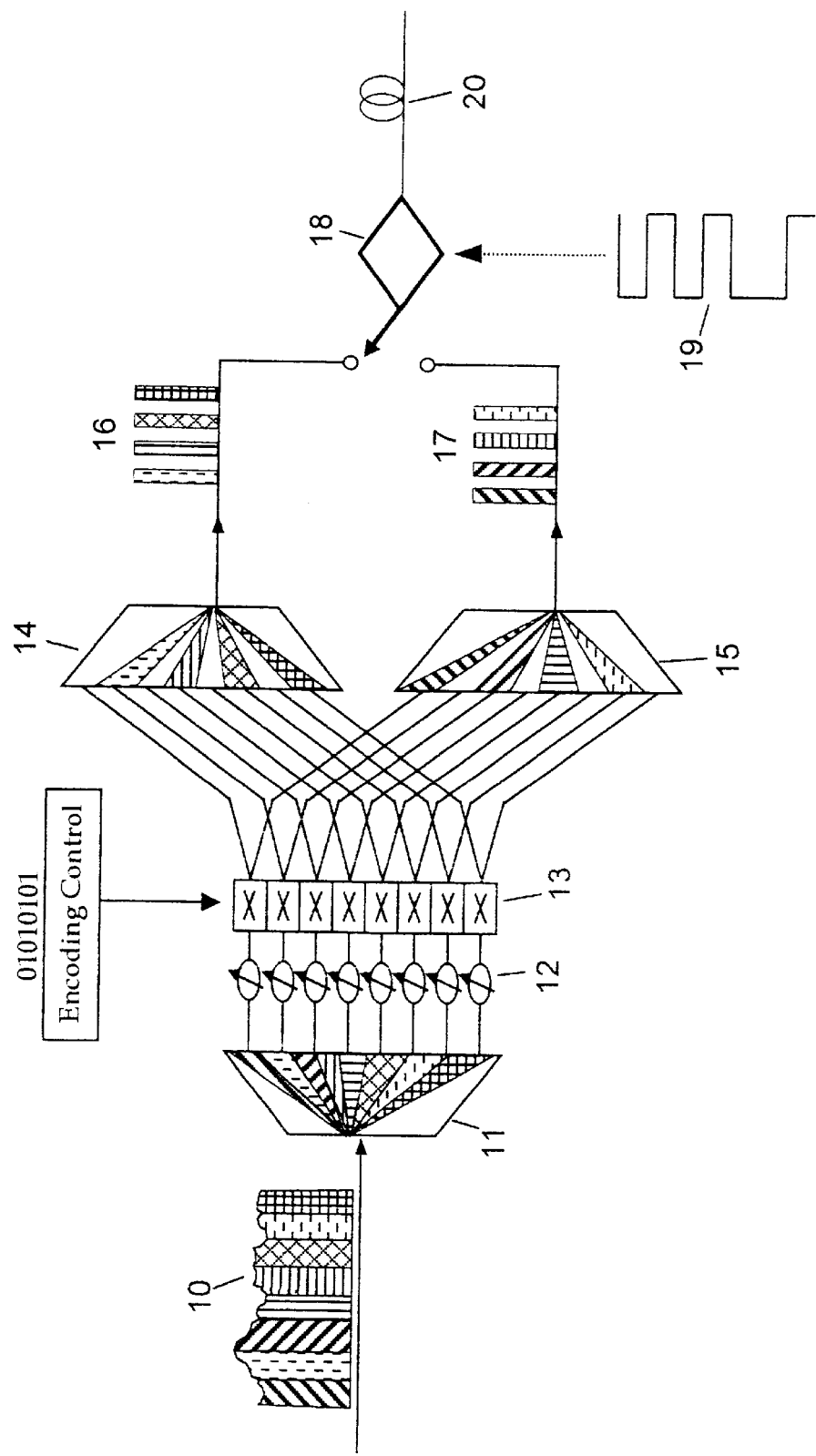
Figure 2:
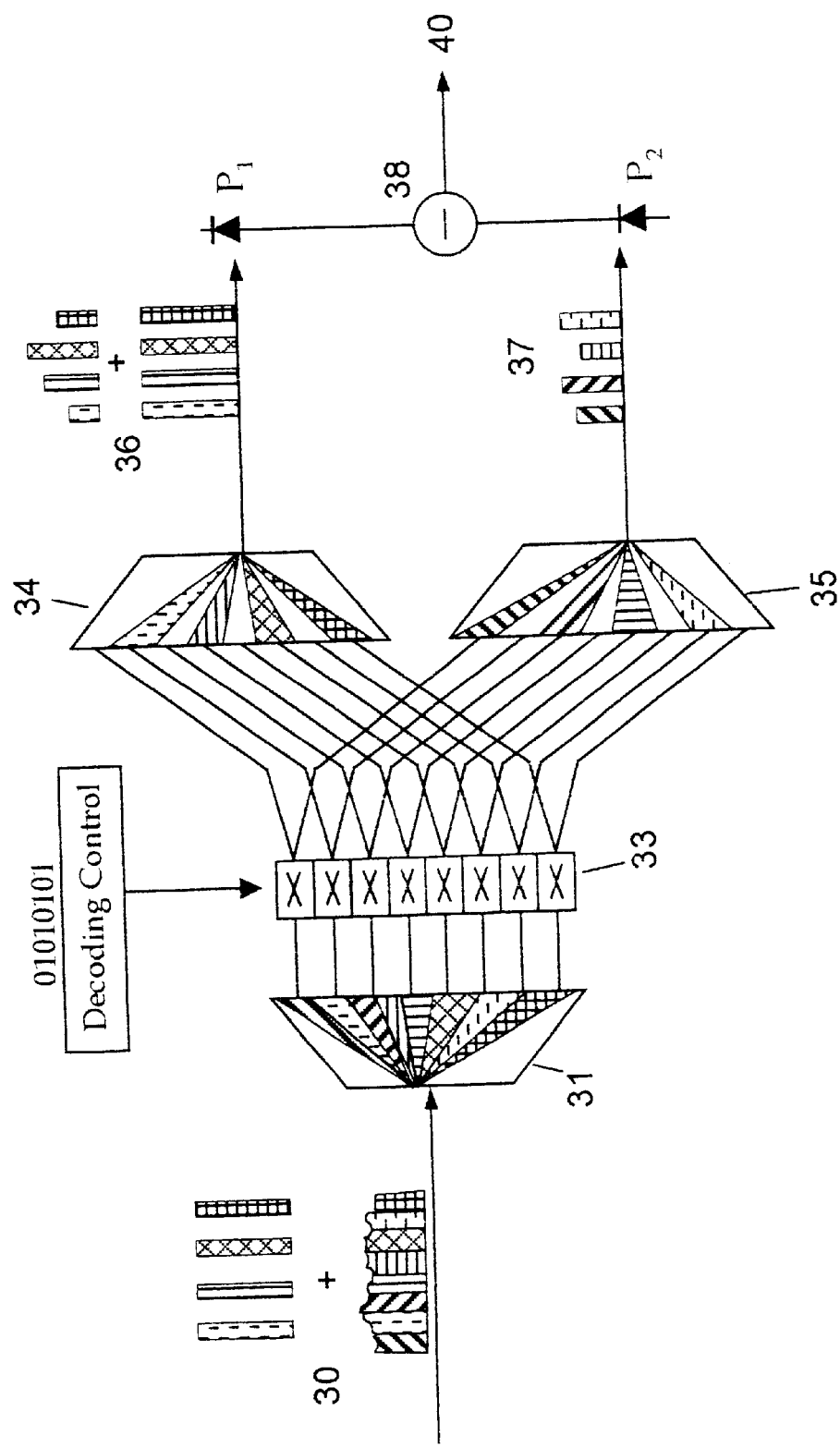
Figure 4:
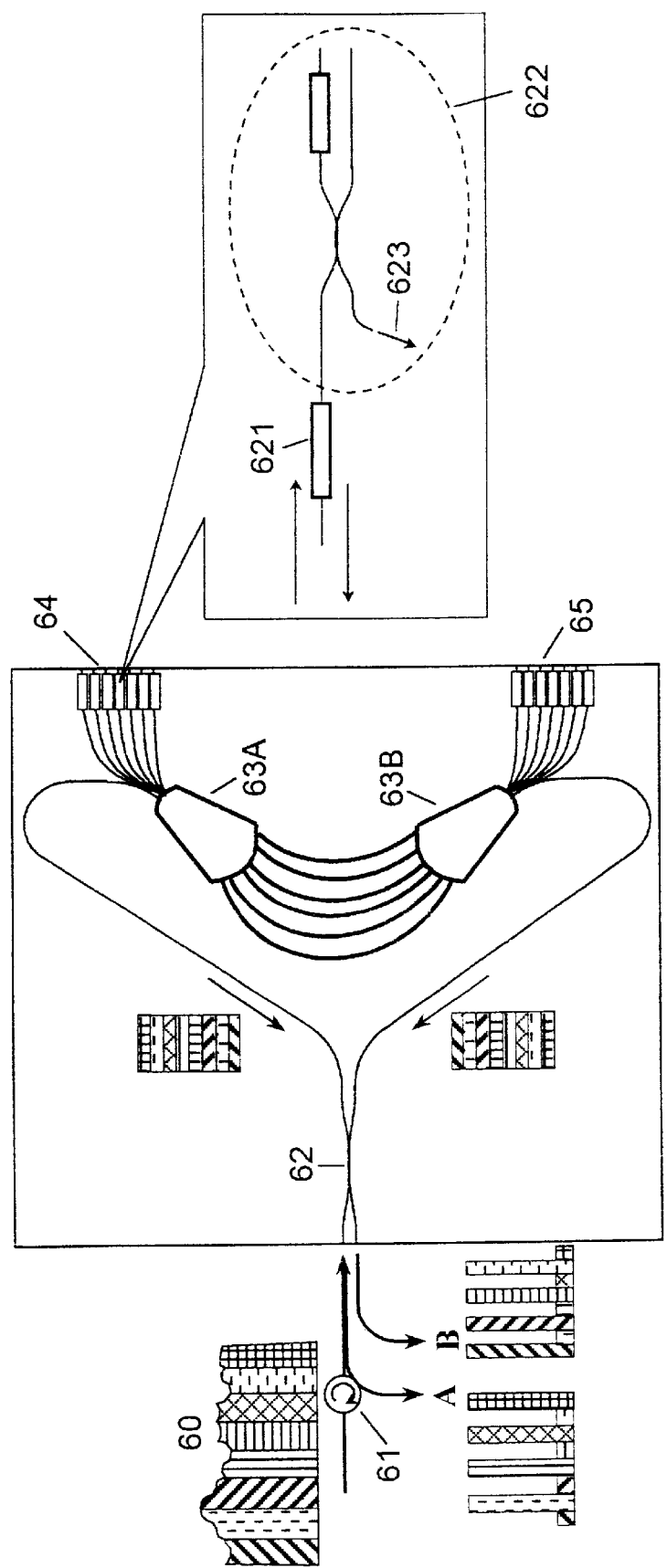
FIG. 4 shows an integrated O-CDMA spectral encoder/decoder of the present invention.
Figure 5A:
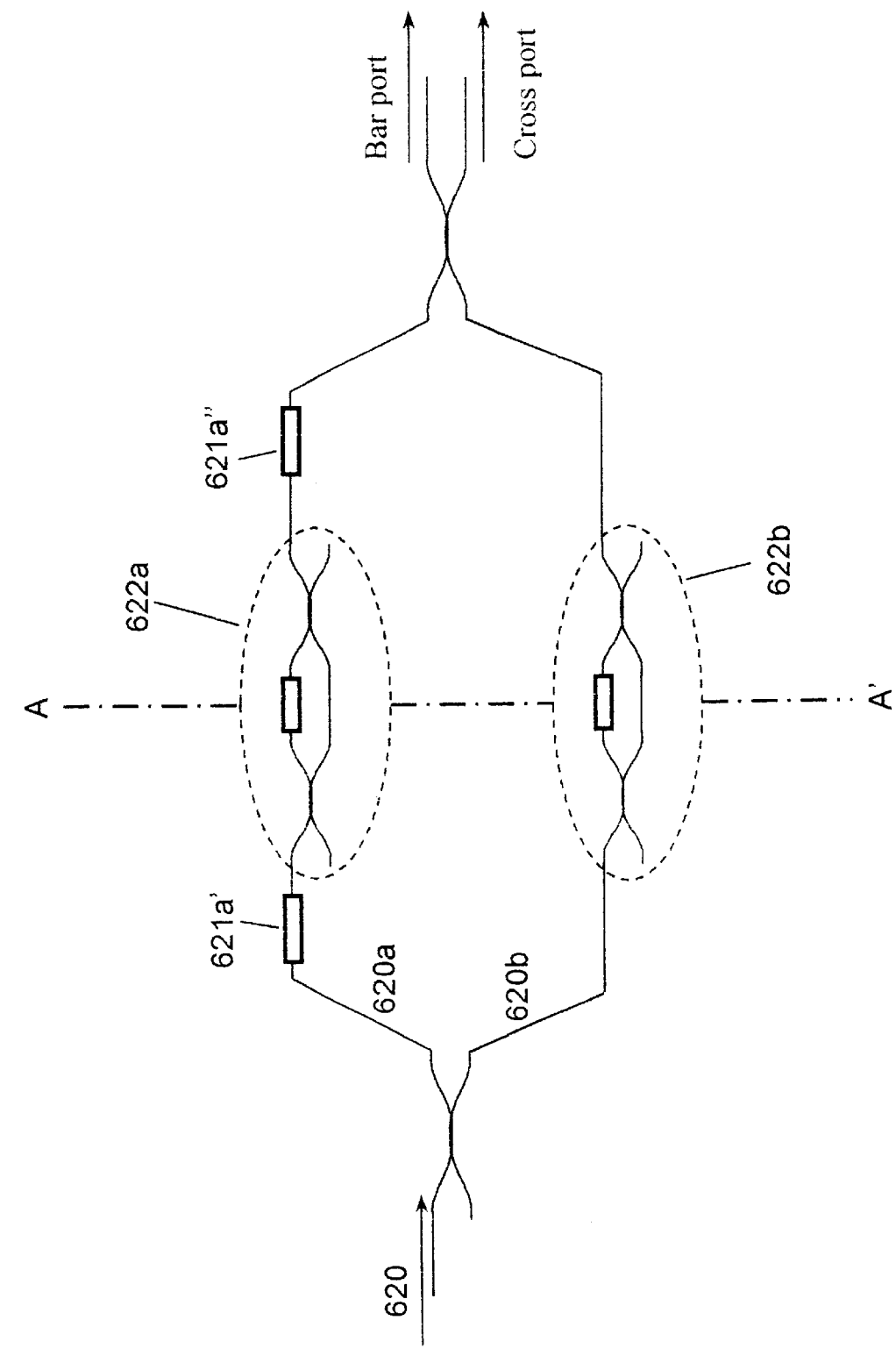
FIG. 5(a) shows a Mach-Zehnder interferometer switch with improved switching extinction ratio capability.

The complete system as shown in FIG. 4 comprises a circulator 61, a 3 dB coupler 62, a single doubled ended AWG 63A/63B, an array of thermooptic phase-shifters 621 and tunable attenuators 622, and a coated, reflecting surface 64/65. The circulator allows the signal to transmit only in one direction. The 3-dB coupler 62 divides the signal into two paths. The double-ended AWG 63A/63B functions as described in connection with FIG. 2 to decompose the input broadband light source into individual spectral components. Each spectral component then passes through a thermooptic phase shifter. The thermooptic phase-shifters 621 and attenuator 622 can adjust the phase-shift and the attenuation thermal-optically. The reflecting surface 64/65 creates virtual counterparts from the real counterparts of the incident image. The whole structure and its image form a large Mach-Zehnder interferometer (MZI) with an AWG, phase shifters, and tunable attenuators in each arm as shown in FIG. 5a. The attenuator 622 is tunable by thermooptic means to equalize the power of each spectral component when the input broadband source is not spectrally uniform. By adjusting the heating power of the phase-shifter on the MZI, the amount of optical power lost to the dump port 623 can be controlled. All operations of the phase-shifters/attenuators are easily achieved with programmable electronic circuits.

Our present invention of a spectral encoder/decoder consists of only one AWG MUX/DEMUX and arrays of 3-dB directional couplers with thermooptic phase shifters. By utilizing the mirror symmetric structure reflected on the gold coated facet at one side, shown in FIG. 4, one can construct a multi-channel 1×2 wavelength selective Mach-Zehnder interferometer (MZI) switch with tunable attenuator array to fulfill the programmable encoding/decoding function for spectral encoded CDMA application. A broadband spectrum source sent into the device is first divided into two parts by input 3-dB coupler and decomposed into individual spectral bands after passing the AWG. Each spectral band then passes through a thermooptic phase shifter and a Mach-Zehnder interferometer (MZI) utilizing the reflection from the facet. Each MZI is designed to be a bar-state to pass and reflect a wavelength component back to the same waveguide. By adjusting the electric power of the heater on one arm, one can control the optic power loss to the cross-port, performing the tunable attenuation function These spectral bands are multiplexed when passed through the AWG again, and each of them beats, at the 3-dB coupler, with its counter-part coming back from the other MZI arm. According to the phase difference adjusted at each phase shifter, these wavelength components can be selectively switched to the output A port or B post and thus form the spectral patterns (codes) for "0" and "1". The programmable functionality is readily achieved by changing the electric powers on all phase shifters in millisecond time period.

A decoder based on correlation detection uses the same functional design. Received signals are demultiplexed into spectral bits, and grouped by the switches, which are now set to correspond to the spectral patterns for data "1" and data "0" from the desired user. (Attenuators are not generally needed but can be used to balance component characteristics.) The two spectral groups are recombined in MUXs and detected by separate photodetectors. These two spectra will generally not be complementary because of the mix of users and data in the received signals. The detectors are arranged in a balanced configuration, and the subtraction of the detector currents produces a bipolar electrical signal used to estimate the transmitted bit based on a threshold operation.

There are several desirable features of this proposed design. First, by applying the planar lightwave circuit (PLC) technology, spectral encoding and decoding functions can be realized by a monolithically integrated PLC chip. The compactness of this design provides the ease to mass production of these devices. Second, the mirror symmetric structure resulted from the reflective design allows one AWG to be reused for both wavelength MUX and DEMUX functions. This eliminates the problem of spectral misalignment due to fabrication errors in multiple-AWG configurations. The number of necessary 3-dB couplers and electric power required to operate TO phase shifters are both reduced by half Third, this design can improve the switching extinction of each spectral component by balancing the split power as well as controlling the phase on each arm of the MZI. This is obvious since there are a phase shifter and a tunable attenuator on each interferometer arm. The mirror reflective structure makes it possible to construct a multi-channel MZI switch for all spectral components with one front-end 3-dB coupler and one AWG. The imperfect switching extinction between two output ports of a MZI switch, primarily due to the splitting ratio imbalances of different 3-dB couplers, can now be reduced to just the effect of a single 3-dB coupler. This design is also applicable to other type of PLC devices that require the function of multi-channel space switching capability, since it is possible to make a perfect 3-dB coupler, through UV trimming, for all channels in one process step.

Figure 3:
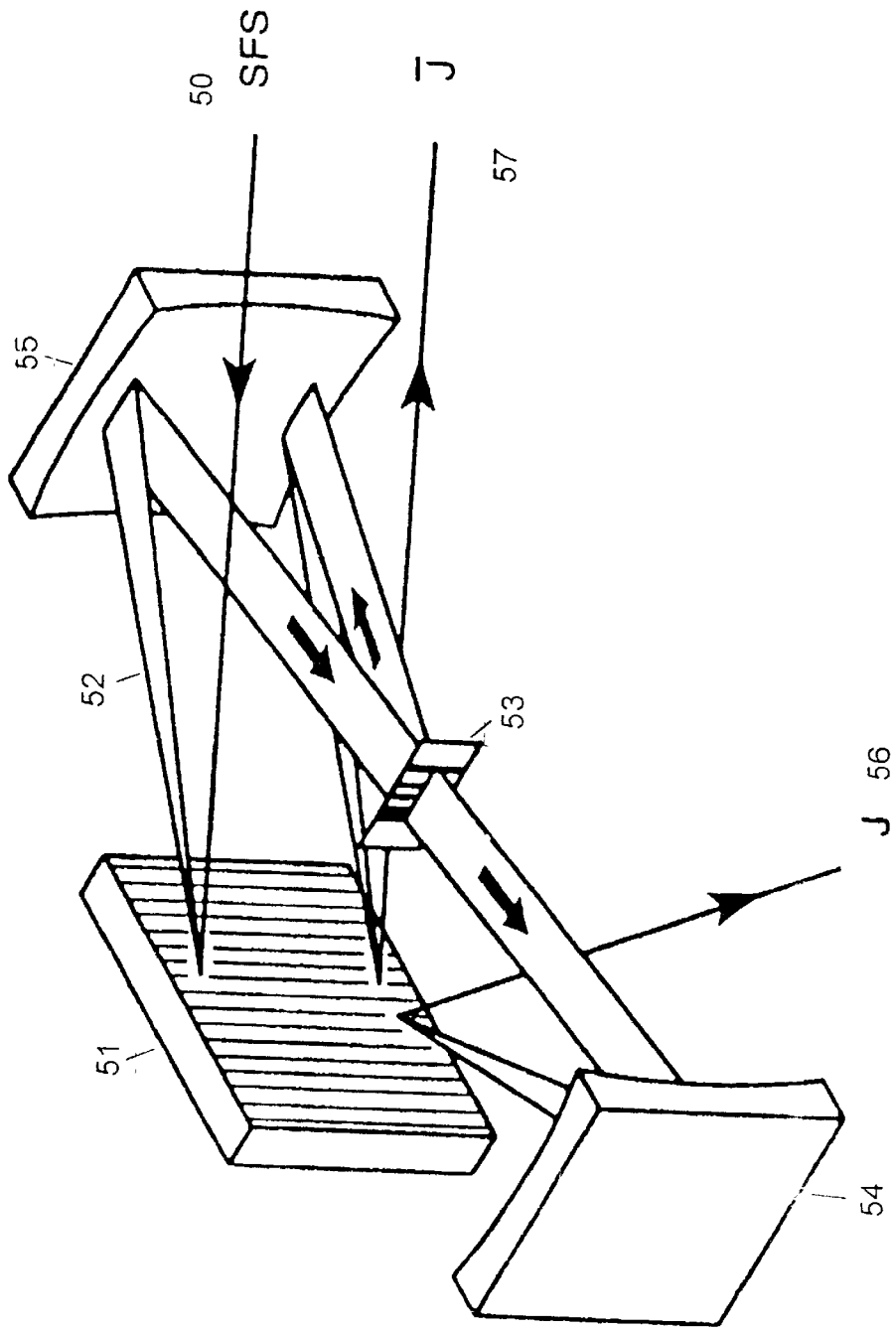
Figure 5B:
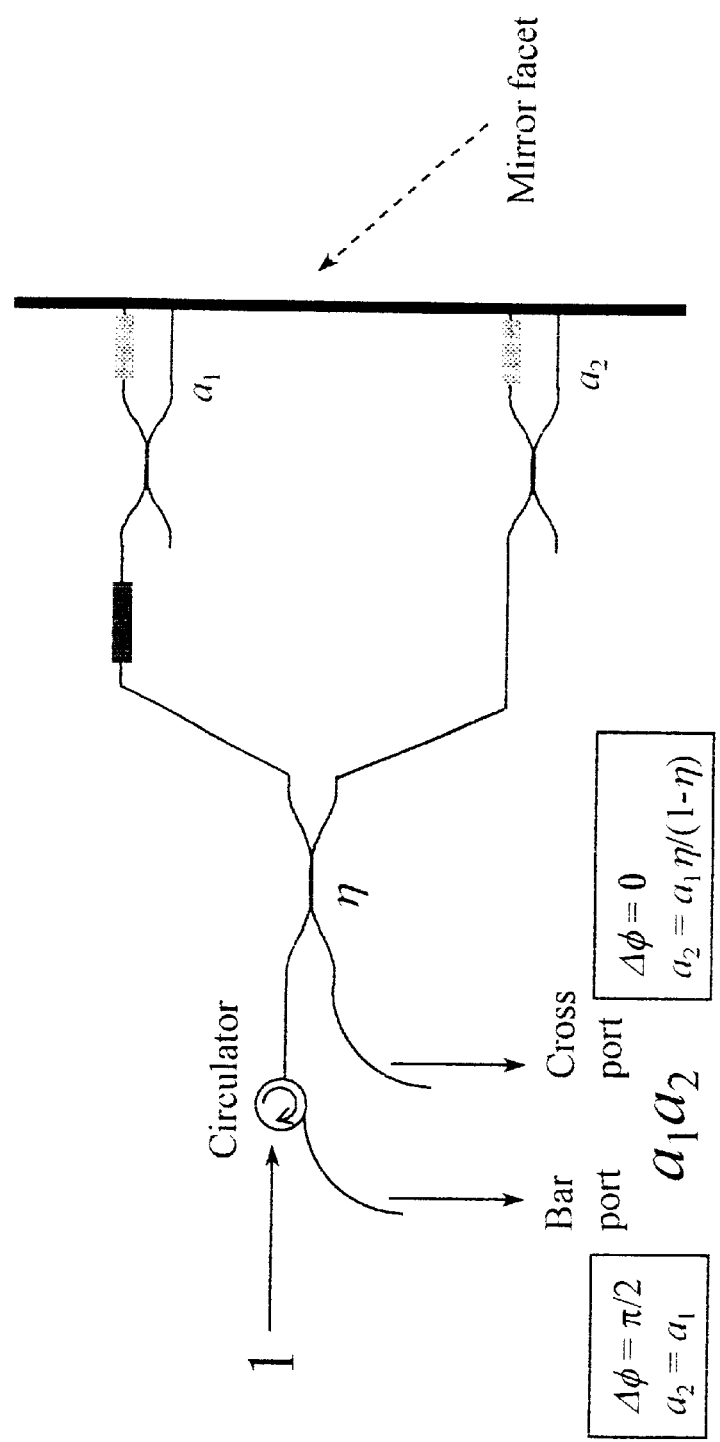
FIG. 5(b) shows a MZI switch used in conjunction with a reflecting mirror.
Figure 6A:
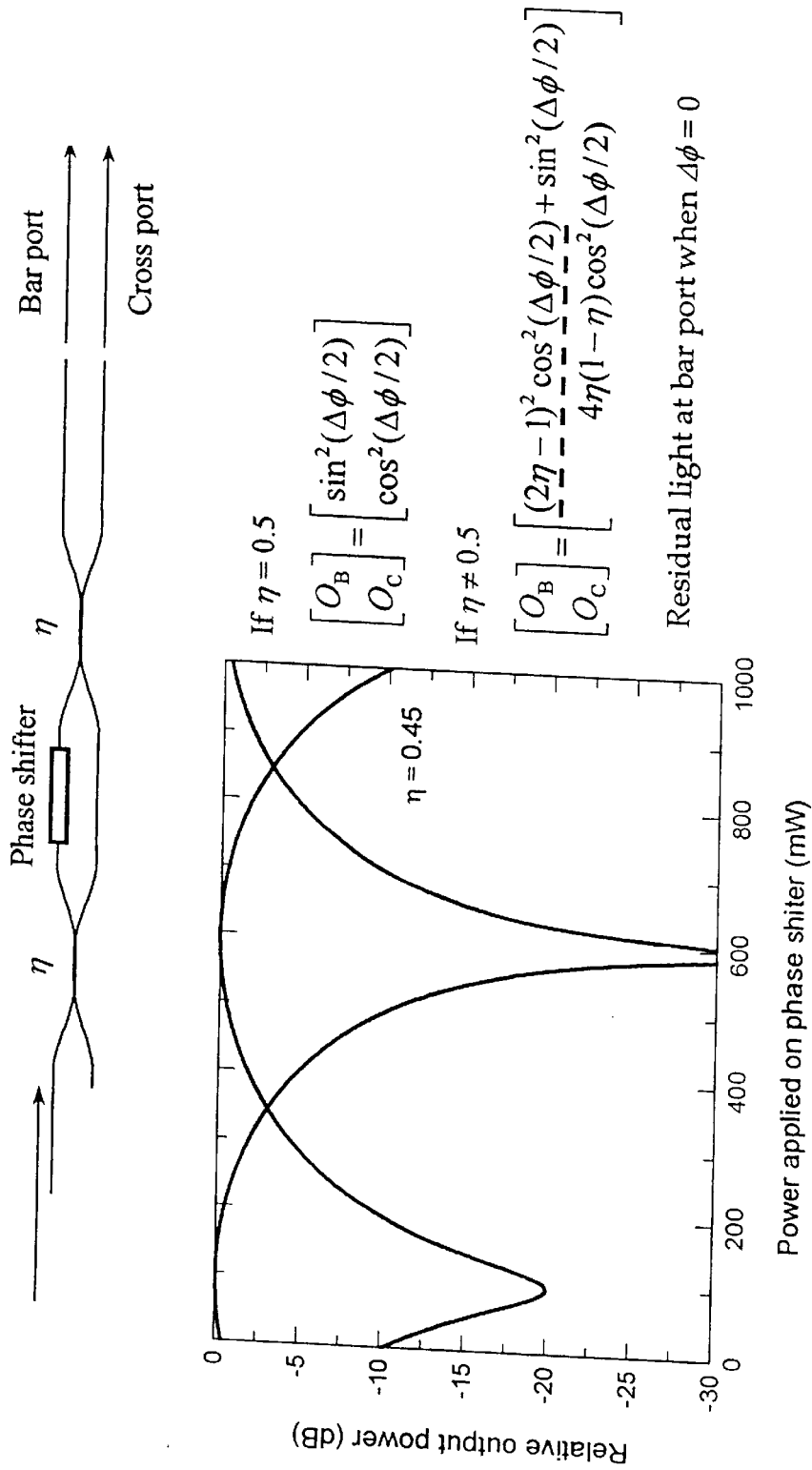
FIG. 6(a) shows the impact of an imbalanced 3 dB coupler to the performance of a conventional MZI switch.

In a MZI switch as shown in FIG. 5a, a signal 620 is split into two paths 620a and 620b. FIG. 5a shows a power balanced MZI switch with better switching extinction ratio. The two attenuators 622a and 622b are used to adjust the power on each arm according to the splitting ratio of the input and output 3-dB couplers. In so doing, one can have better extinction output ratio than a conventional MZI switch without ideal 3-dB couplers, as shown in FIGS. 6a–6b. This is an important requirement to generate high extinction spectral chips as stated in our published paper. The upper path 620a has phase shifters 621a', 621a'' and an attenuator 622a, but the lower path 620b does not have the phase shifters such that the signal output at the end of the phase-shifter attenuator of the two paths are out of phase. Due to interference, the output can be digital "1" or "0". The "1" output is fed to a Bar port and the "0" output is fed to a Cross port. As shown in this figure, the phase-shifter attenuator has a symmetrical structure of the input end and the output end. In this invention, the reflecting mirror is placed at the mid-point of the phase-shifter attenuator as shown in FIG. 5b. This arrangement is a folded structure of FIG. 5a along the section line A–A'. Because of the reflection of the mirror, the length of the phase-shifter attenuator can be cut in half. In terms of area, the area on an integrated circuit chip is reduced. Also, the AWG is irradiated by both the incoming light to the phase-shifter/attenuator and the outgoing light reflected by the mirror as explained in connection with FIG. 3. Thus the number of AWG is reduced. Depending on the phase difference set by the phase-shifter, each spectral strip will be switched to output port A or B, thus forming the two complementary spectral patterns or codes.

To examine the functionality of the complex integrated circuits in this design, we utilized wavelength transfer matrix method and calculated the device performance. The integrated spectral encoder/decoder can be separated into individual device elements: the front-end /3-dB coupler, the AWG MUX/DEMUX, the phase shifter array, and the tunable attenuator array. A simple transfer matrix for the input 3-dB coupler is given by $$M_{3dB} = \begin{bmatrix} \sqrt{\eta} & i\sqrt{1-\eta} \\ i\sqrt{1-\eta} & \sqrt{\eta} \end{bmatrix},$$

where $\eta$ is the power splitting ratio of the 3-dB coupler ($\eta=0.5$ ideally). The field transmission spectral output of an AWG demultiplexer can be approximately expressed as $$T_j(\lambda) = E_o \exp\left\{-\left[\frac{\partial Y}{\partial \lambda}(\lambda - \lambda_0 - \Delta\lambda \cdot j)/w_0\right]^2\right\} + E_{noise},$$

where $\partial Y/\partial \lambda$ is the grating linear dispersion on the output focal plane, $\Delta\lambda$ is the channel spacing, $w_0$ is half of the waveguide mode field diameter, and $E_{noise}$ is the crosstalk noise floor. It represents the element in a 1×N DEMUX transfer matrix, $M_{demux}$, where input at center ($0^{th}$) channel and output at the jth channel. A MUX transfer matrix $M_{mux}$ is simply the inverse of $M_{demux}$. The matrix of a phase shifter array $M_{ph}$ contains only non-zero diagonal terms, each takes the form exp ($i\Delta\phi/2$) for one arm and exp ($-\Delta\phi/2$) for the other of the MZI switch with the phase difference $\Delta\phi$ between these two arms. A diagonal matrix $M_{attn}$ containing the attenuation coefficients ($\leq 1$) represents the attenuator array. The encoded output spectral patterns can thus be represented by multiplying the total transfer matrix $M_{3dB}M_{demux}M_{ph}M_{attn}M_{ph}M_{mux}M_{3dB}$ to the input broadband source.

Figure 7:
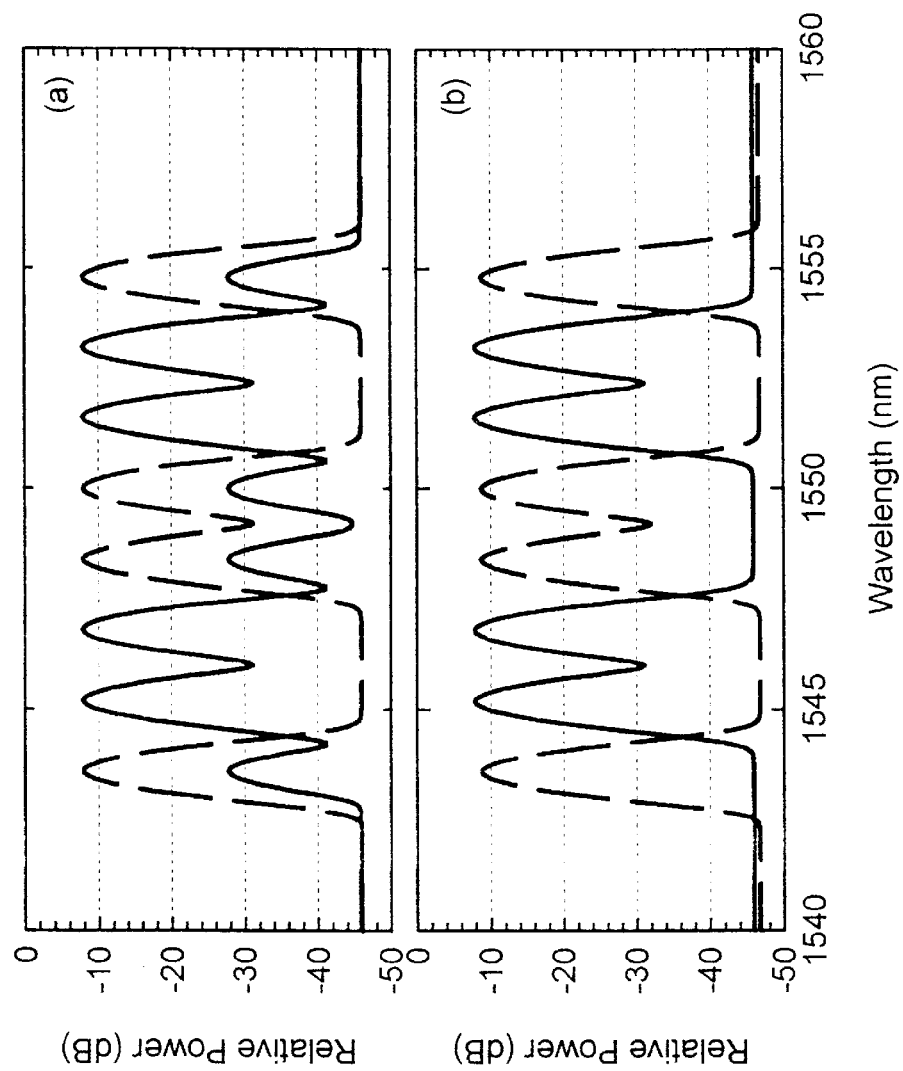
FIG. 7 shows a comparison for increased output extinction ratio among spectral chips.

We considered an 8-bit AWG encoder generating a Hadamard code (10011001) for "1" and it complementary code (01100110) for "0", with 1.6 nm spectral spacing between adjacent bits. These noise floor and loss of the AWG were taken as −25 dB and −4 dB, respectively, relative to the input power. FIG. 7 shows the calculated spectral patterns for codes "1" at output port B and "0" at output port A when input with a flattened source. Assuming the front-end 3-dB coupler has an imperfect splitting ratio of 0.55/0.45 ($\eta=0.55$). Without power balance adjustment, by the attenuators, the extinction ratio (FIG. 7(a)) was only around 20 dB between bit 1 and bit 0 for code "0" at output port A. FIG. 7(b) illustrates the case where attenuators are adjusted to balance the powers on the $2^{nd}$, $3^{rd}$, $6^{th}$, and $7^{th}$ pairs of arms in the MZI switch to maximize the extinction ratio. The extinction ratio was improved to better than 35 dB and was limited by the noise floor of the AWG. One should notice that the noise floor of both output ports are reduced to ∼−46 dB, since the input signal has to pass through the AWG twice to reach the output ports. When transmitted signals reach the decoder, the noise floor will be suppressed twice. Therefore large crosstalk noise of very dense AWG, mainly caused by processing errors, will not affect the encoding/decoding functions of the device. This will further increase the extinction between code bit "1" and "0" decoded at the receiving end, and improves the rejection capability against multiple access interference (MAI) of a serially encoded CDMA system The tunable attenuators can simultaneously adjust the power of each spectral band so that each code bit will have equal bit weight for the decoding correlation process, even when the input light source is not ideally flattened. This ensures better autocorrelation property for different optical codes and increases the signal-to-interference ratio (SIR) to support more access users.

While the preferred embodiments of the invention have been described, it will be apparent to those skilled in the art that. various modifications may be made in the embodiments without departing from the spirit of the present invention. For example, an electro-optic switch/phase shifter can be used in leu of the thermal-optic switch/phase-shifter. Such modifications are all within the scope of this invention.

What is claimed is:

1. A spectral encoder/decoder, comprising:
   a directional coupler;
   an arrayed waveguide grating (AWG) optically coupled to the directional coupler, wherein the AWG is configured to receive first and second output signals from the directional coupler, and to output the first and second output signals as first and second sets of individual spectral components, respectively;
   a phase controller optically coupled to the AWG for selectively imparting a phase shift on the individual spectral components output by the AWG; and
   a redirector for redirecting the first and second set of individual spectral components back through the AWG and the directional coupler;
   wherein the directional coupler, AWG, phase controller and redirector are arranged in a wavelength selective Mach-Zehnder interferometer switch configuration.

2. The spectral encoder/decoder of claim 1, wherein the directional coupler divides the redirected individual spectral components into first and second complementary spectral codes based on the phase shift selectively imparted on the individual spectral components by the phase controller.

3. The spectral encoder/decoder of claim 2, wherein the redirected first and second sets of individual spectral components are coupled into a first and second ports of the directional coupler, respectively.

4. The spectral encoder/decoder of claim 3, wherein each redirected individual spectral component coupled into the first and second ports of the directional coupler exit the directional coupler from a third or fourth port of the directional coupler in accordance with the phase shift selectively imparted on the redirected spectral component by the phase shifter.

5. The spectral encoder/decoder of claim 1, wherein the phase controller comprises a respective phase shifter for each individual spectral component.

6. The spectral encoder/decoder of claim 5, further comprising a plurality of optical attenuators, wherein each optical attenuator is positioned to selectively attenuate a respective individual spectral component output from the AWG.

7. The spectral encoder/decoder of claim 6, wherein the plurality of optical attenuators comprise a plurality of phase shifters, wherein each phase shifter is positioned between a respective phase shifter and the redirector.

8. The spectral encoder/decoder of claim 7, wherein the plurality of phase shifters comprise a plurality of thermooptic phase shifters.

9. The spectral encoder/decoder of claim 1, wherein the redirector comprises a reflector.

10. The spectral encoder/decoder of claim 1, wherein the directional coupler comprises a 3-db optical coupler.

11. A spectral encoder/decoder, comprising:
    a directional coupler for splitting an input optical signal into first and second output signals;
    an arrayed waveguide grating (AWG) optically coupled to the directional coupler, wherein the AWG is configured to receive the first and second output signals at first and second ends, respectively, and to output the first and second output signals as first and second sets of individual spectral components, respectively;
    a phase controller optically coupled to the first and second ends of the AWG for selectively imparting a phase shift on the individual spectral components output by the AWG;
    a redirector for redirecting the first and second set of individual spectral components back through the AWG, wherein the redirected first and second set of individual spectral components exit from respective ends of the AWG as first and second multiplexed signals, and re-enter the directional coupler.

12. The spectral encoder/decoder of claim 11, wherein the directional coupler divides the redirected individual spectral components into first and second complementary spectral codes based on the phase shift selectively imparted on the individual spectral components by the phase controller.

13. The spectral encoder/decoder of claim 12, wherein the redirected first and second sets of individual spectral components are coupled into a first and second ports of the directional coupler, respectively.

14. The spectral encoder/decoder of claim 13, wherein each redirected individual spectral component coupled into the first and second ports of the directional coupler exit the directional coupler from a third or fourth port of the directional coupler in accordance with the phase shift selectively imparted on the redirected spectral component by the phase shifter.

15. The spectral encoder/decoder of claim 11, wherein the phase controller comprises a respective phase shifter for each individual spectral component.

16. The spectral encoder/decoder of claim 15, further comprising a plurality of optical attenuators, wherein each optical attenuator is positioned to selectively attenuate a respective individual spectral component output from the first or second ends of the AWG.

17. The spectral encoder/decoder of claim 16, wherein the plurality of optical attenuators comprise a plurality of thermooptic phase shifters, wherein each thermooptic phase shifter is positioned between a respective phase shifter and the redirector.

18. The spectral encoder/decoder of claim 11, wherein the redirector comprises a reflector.

19. The spectral encoder/decoder of claim 11, wherein the directional coupler comprises a 3-db optical coupler.

20. The spectral encoder/decoder of claim 11, wherein the directional coupler, double-ended AWG, phase controller, and redirector are configured in a Mach-Zehnder interferometer configuration.

21. A spectral encoder/decoder, comprising:
    a directional coupler for splitting an input optical signal into first and second output signals;
    an arrayed waveguide grating (AWG) optically coupled to the directional coupler, wherein the AWG is configured to receive the first and second output signals at first and second ends, respectively, and to output the first and second output signals from the second and first ends as first and second sets of individual spectral components, respectively;
    a phase controller optically coupled to the first and second ends of the AWG for selectively imparting a phase shift on the individual spectral components output by the AWG; and
    a redirector for redirecting the first and second set of individual spectral components back through the AWG through the second and first ends, respectively, wherein the redirected first and second set of individual spectral components exit from the first and second ends of the AWG as first and second multiplexed signals, respectively and re-enter the directional coupler.

* * * * *

UNITED STATES PATENT AND TRADEMARK OFFICE
CERTIFICATE OF CORRECTION

PATENT NO. : 6,807,372 B1
DATED : October 19, 2004
INVENTOR(S) : Chauhan Daniel Lee, Shan Zhong and Yung Jui Chen It is certified that error appears in the above-identified patent and that said Letters Patent is hereby corrected as shown below:

Title Page,
Item [73], Assignee, "University of Maryland, Baltimore MD (U.S.)" should read
-- University of Maryland, Baltimore County, Baltimore, MD (U.S.) --.

Signed and Sealed this

Twenty-fifth Day of January, 2005

JON W. DUDAS
*Director of the United States Patent and Trademark Office*